United States Patent
Wagner

(10) Patent No.: US 10,865,285 B2
(45) Date of Patent: Dec. 15, 2020

(54) FLEXIBLE FOAM FORMULATION

(71) Applicant: SIKA TECHNOLOGY AG, Baar (CH)

(72) Inventor: Natalie Wagner, Appenzell (CH)

(73) Assignee: SIKA TECHNOLOGY AG, Baar (CH)

( * ) Notice: Subject to any disclaimer, the term of this patent is extended or adjusted under 35 U.S.C. 154(b) by 25 days.

(21) Appl. No.: 16/321,065

(22) PCT Filed: Jul. 28, 2017

(86) PCT No.: PCT/EP2017/069225
§ 371 (c)(1),
(2) Date: Jan. 28, 2019

(87) PCT Pub. No.: WO2018/020031
PCT Pub. Date: Feb. 1, 2018

(65) Prior Publication Data
US 2019/0169394 A1 Jun. 6, 2019

(30) Foreign Application Priority Data

Jul. 28, 2016 (DE) .................. 10 2016 113 988

(51) Int. Cl.
| | |
|---|---|
| *C08G 18/12* | (2006.01) |
| *C08G 18/18* | (2006.01) |
| *C08G 18/40* | (2006.01) |
| *C08G 18/42* | (2006.01) |
| *C08G 18/48* | (2006.01) |
| *C08G 18/50* | (2006.01) |
| *C08G 18/76* | (2006.01) |
| *C08J 9/00* | (2006.01) |
| *C08J 9/14* | (2006.01) |
| *C08K 5/521* | (2006.01) |
| *C08K 5/49* | (2006.01) |
| C08G 101/00 | (2006.01) |

(52) U.S. Cl.
CPC .............. *C08J 9/141* (2013.01); *C08G 18/12* (2013.01); *C08G 18/1825* (2013.01); *C08G 18/1833* (2013.01); *C08G 18/4018* (2013.01); *C08G 18/4213* (2013.01); *C08G 18/4812* (2013.01); *C08G 18/4829* (2013.01); *C08G 18/5003* (2013.01); *C08G 18/7664* (2013.01); *C08G 18/7671* (2013.01); *C08J 9/0038* (2013.01); *C08J 9/142* (2013.01); *C08J 9/149* (2013.01); *C08K 5/49* (2013.01); *C08K 5/521* (2013.01); C08G 2101/0008 (2013.01); C08G 2350/00 (2013.01); C08J 2201/022 (2013.01); C08J 2203/12 (2013.01); C08J 2203/14 (2013.01); C08J 2203/202 (2013.01); C08J 2205/05 (2013.01); C08J 2205/06 (2013.01); C08J 2207/04 (2013.01); *C08J 2375/06* (2013.01); *C08J 2375/08* (2013.01)

(58) Field of Classification Search
CPC ..... C08G 18/10; C08J 9/142; C08J 2201/022; C08J 2203/12; C08J 2203/14; C08J 2205/05; C08J 2207/04
See application file for complete search history.

(56) References Cited

U.S. PATENT DOCUMENTS

| | | | | |
|---|---|---|---|---|
| 4,263,412 A | * | 4/1981 | Pauls ..................... | C08J 9/14 521/114 |
| 6,054,499 A | * | 4/2000 | Pauls ..................... | C08G 18/10 521/132 |
| 6,552,097 B1 | * | 4/2003 | Pauls ..................... | C08G 18/10 222/491 |
| 2001/0049454 A1 | * | 12/2001 | Nutzel ..................... | C08J 9/149 560/25 |

FOREIGN PATENT DOCUMENTS

| | | |
|---|---|---|
| DE | 10108445 A1 | 9/2002 |
| EP | 0597281 A2 | 5/1994 |
| WO | 85/00157 A1 | 1/1985 |

OTHER PUBLICATIONS

Oct. 19, 2017 International Search Report issued in International Patent Application No. PCT/EP2017/069225.

* cited by examiner

*Primary Examiner* — Melissa A Rioja
(74) *Attorney, Agent, or Firm* — Oliff PLC

(57) ABSTRACT

Two-component formulation for producing open-cell flexible foams having compressive strength of ≤1N/cm², contained in 2-component aerosol can with crosslinker sleeve which can be opened prior to deploying formulation from aerosol can wherein the contents thereof enter aerosol can, wherein first component is present in aerosol can and second component that is reactive to first component is present separately in crosslinker sleeve and wherein aerosol can includes prepolymer composed of 25-35% by weight MDI and 40-55% by weight of polyol mixture having free isocyanate groups, and 10-21% by weight of propellant gas mixture and crosslinker sleeve includes 4-10% by weight of crosslinker mixture, wherein weight data are based on weight of formulation. Polyol mixture includes at least one trifunctional polyether and bifunctional polyester polyols, together with flame retardant, foam stabilizer, cell opener, amine catalyst, and crosslinker mixture including ethylene glycol in deficiency relative to free isocyanate groups and amine catalyst.

15 Claims, No Drawings

FLEXIBLE FOAM FORMULATION

The invention relates to a two-component formulation for producing open-cell flexible foams having a compression strength of ≤1N/cm², contained in a 2-component aerosol can with a crosslinker sleeve which can be opened prior to deploying the formulation from the aerosol can such that the contents thereof enter the aerosol can, wherein a first component is present in the aerosol can and a second component that is reactive to the first component is present separately in the crosslinker sleeve and wherein the aerosol can comprises a prepolymer composed of 25 to 35% by weight MDI and 40 to 55% by weight of a polyol mixture having free isocyanate groups, and 10 to 21% by weight of a propellant gas mixture and the crosslinker sleeve comprises 4 to 10% by weight of a crosslinker mixture.

Canned foams are known in numerous variants for different purposes. For example they are used in the construction industry for the assembly of window and door frames, for bonding materials, for insulation purposes and for filling cavities and building joints. As a rule, these are polyurethane foams which are formed in the case of crosslinking prepolymers comprising isocyanate groups with polyols or water.

Conventional prepolymer compositions for polyurethane foams comprise a prepolymer component having a minimum content of reactive isocyanate groups. The prepolymer itself is a polymer of suitable viscosity having terminal isocyanate groups. In order to obtain polyurethane prepolymers having terminal isocyanate groups, it is customary to react polyfunctional alcohols with an excess of monomeric polyisocyanates.

Commonly used polyisocyanates are, for example, diisocyanatodiphenylmethane, commonly referred to as MDI, tolylene diisocyanate (TDI), 1,6-diisocyanatohexane (HDI), 1,5-diisocyanatonaphthalene (NDI) and isophorone diisocyanate (IPDI). All these polyisocyanates can be used as pure substances but also as mixtures of different isomers or as mixtures with higher homologs (for example crude MDI). Reactive derivatives are, for example dimeric and trimeric forms of the polyisocyanates. A functionality of 2 is important.

To produce the prepolymers, the polyisocyanates are reacted with hydroxyl group-containing polyethers, polyesters or with polyols, wherein attention should be paid to a suitable viscosity of the prepolymer formed in this case for the respective purpose. To control and accelerate the reaction, said reaction takes place in the presence of catalysts, frequently amine catalysts.

Numerous polyether polyols and polyester polyols are used for the reaction to give prepolymer, especially those having a hydroxyl number of 30 to 350.

The prepolymers are contained in aerosol cans and are discharged from the can and foamed with the aid of propellant gases, wherein moisture present in the environment assists the foam formation. The propellant gases are liquid under the pressure prevailing in the aerosol can and evaporate after expulsion from the aerosol can.

In the case of canned foams, a distinction is made between one-component and two-component foams. 1-Component polyurethane foams crosslink with the aid of water present on surfaces or in the ambient air. 2-Component polyurethane foams crosslink with the aid of a second component, which is present separated from the other ingredients of the aerosol can in a closed inner or crosslinking sleeve, and is matched in terms of amount to the reactive isocyanate groups of the prepolymer.

Further known are so-called 1.5-component polyurethane foams which represent transitional forms between 1-component and 2-component foams. In the case of 1.5-component foams, a second component is added to the prepolymer in an insufficient amount to react with the free isocyanate groups present therein, prior to being dispensed from the pressure can. The final curing of the foam takes place with the aid of moisture in the air.

Aerosol cans with crosslinker sleeves have often been described, for example in WO 85/00157 A. The crosslinker sleeve can be opened externally directly prior to deployment of the foam, for example by means of a plunger or pin, such that the contents escape into the prepolymer present in the surrounding aerosol can and can be mixed by shaking.

The second component is generally a polyol or water. It is released into the can directly prior to discharging the foam; the foam must then be rapidly discharged since otherwise the danger exists that the contents of the can thickens due to the reaction between the two components such that discharge is impossible. The pot life is generally only a few minutes.

The formulations for producing canned foams also comprise additives for influencing the foam properties, for example viscosity regulators, cell openers, stabilizers and flame retardants.

Conventional polyurethane foams, such as are used for assembly purposes for example, are relatively inflexible and hard, generally having a compressive strength of significantly more than 10 N/cm². These foams are suitable for bearing and fixing loads but have a relatively low flowability. The formulations used for such foams are generally adjusted for rapid solidification. The penetration capacity in deep cavities is limited, for example in hollow spaces of relatively large length, also due to their (undesirable) adhesion to surfaces. They generally have high thermal insulation capacities, but deficiencies in terms of sound insulation.

The object of the invention is based on providing a canned foam for filling cavities with foam. The foam should have good flowability and little tendency to shrink, as a result it can fill cavities completely and permanently, for example even in elongated metal sections. In addition to thermal insulating properties, it should have good sound insulation properties.

This object is achieved with a formulation of the type specified at the outset, in which the polyol mixture comprises at least one trifunctional polyether polyol and at least one bifunctional polyester polyol, together with a flame retardant, a stabilizer, a cell opener and an amine catalyst and the crosslinker mixture comprises ethylene glycol in deficiency relative to the free isocyanate groups of the prepolymer and an amine catalyst.

The formulation according to the invention is characterized by matching the individual components and arrangements to one another which ensures the desired foam properties for filling cavities with foam.

It has been found that the required flowability of the foam can only be achieved with a 2-component flexible foam with a specific selection of the polyol components. The flexible foam properties arise due to the selection of the polyol components in the polyol mixture and in the crosslinker sleeve. By means of crosslinking the prepolymer with a deficiency of ethylene glycol, the deployed foam maintains its flow properties over a sufficient time for the application.

Preferably, the amount of ethylene glycol in the crosslinker sleeve is sufficient to saturate 80 to 95% of the free isocyanate groups in the prepolymer, especially 85 to 90%.

Useful flame retardants are particularly low-viscosity liquid phosphates and phosphites, for example tris(2-ethylhexyl) phosphate, tris(2-chloropropyl) phosphate (TMCP), triethyl phosphate and organic phosphonate esters. Further useful flame retardants are halogenated polyols which can be incorporated into the prepolymer.

The use of phosphates, especially tris(2-chloroisopropyl) phosphate (TMCP), also contributes to the good flowability of the foam system according to the invention. TMCP is a well-known flame retardant which also serves additionally as plasticizer. It has now been found that TMCP also acts favorably on the rheology and contributes to the flowability of the discharged foam. The flame retardant effect is desirable in many applications, also in the automotive industry, and can optionally be further improved by adding further flame retardant, for example halogenated polyetherols. TMCP is present in the polyol mixture used in accordance with the invention, wherein the ratio by weight of the polyols to the TMCP is preferably in the range from 85:15 to 60:40.

The polyol mixture used to produce the prepolymer comprises at least one trifunctional polyether polyol and at least one bifunctional polyester polyol in accordance with the invention. In this configuration, a sufficiently crosslinked prepolymer on the one hand and a particular degree of softness on the other hand is produced. Suitable polyether polyols are in particular alkoxylated glyceryl ethers, for example polyoxypropylene glyceryl ether. Useful polyester polyols are particularly those of the PET type.

In accordance with the invention, the prepolymer is formed from 25 to 35% by weight MDI and 40 to 55% by weight of the polyol mixture. In this case, the MDI used can be pure isomers or mixtures of isomers, but the use of crude MDI is preferred as stated at the outset.

The polyol mixture also comprises flame retardants in addition to the polyols, as mentioned above, and also one or more foam stabilizers, cell openers and amine catalysts. The foam stabilizers known in and of themselves should stabilize the foam in terms of volume, i.e. counteract shrinkage during curing. For the same purpose, cell openers are added which enable a rapid outgassing of the cells before the propellant contained therein softens the cell walls. The amine catalyst serves to accelerate prepolymer formation. At the same time, it should catalyze the final crosslinking of the foam discharged into the cavity with the moisture present or penetrating via air exchange. In this manner, a post-foaming effect counteracting the shrinkage arises. For this reason, preference is given to amine catalysts which catalyze the reaction of isocyanate groups with water, for example catalysts based on morpholines, for example DMDEE (2,2-dimorpholinodiethyl ether).

The propellant is also additionally present in the aerosol can, generally a mixture of propane, butane and dimethyl ether. In particular, the dimethyl ether makes up 40 to 70% by weight of the propellant gas mixture. The propellant gas mixture itself makes up in total 10 to 21% by weight of the total formulation, excluding the proportion in the crosslinker sleeve.

The crosslinker sleeve comprises ethylene glycol as crosslinker in an amount which is insufficient to saturate the free isocyanate groups in the prepolymer. In addition, the crosslinker sleeve comprises at least one amine catalyst which is able to catalyze the reaction of ethylene glycol with the prepolymer. In this case, preference is given to catalysts comprising a dimethylamino group, for example bis(2-dimethylaminoethyl) ether and/or 2-(2-dimethylaminoethyl) ethanol. By means of catalysts having a dimethylamino group, the crosslinking reaction with the prepolymer is somewhat "stretched", such that the pot life and the flowable phase of the foam is sufficiently extended for the stated purpose.

A certain amount of flame retardant, TMCP for example, or also another unreactive substance, for example a small amount of a solvent, can be mixed with the content of the crosslinker sleeve in order to dilute the ethylene glycol and thus to cause a slowing of the crosslinking. A further reason is optionally the complete filling of the crosslinker sleeve in order to prevent penetration of the surrounding content of the aerosol can that is under pressure. The crosslinker sleeve, by reason of its construction, is generally not involved in the pressure regime of the aerosol can.

The crosslinker sleeve can in particular also comprise a small amount of dye which enables the homogeneity of the discharged foam to be verified after triggering the crosslinker sleeve by means of the color distribution. After triggering the crosslinker sleeve, aerosol cans with the crosslinker sleeve must be adequately shaken in order to achieve uniform mixing of the two components. The color distribution shows the user whether a uniform distribution of the crosslinker mixture has been achieved.

The dye in the crosslinker sleeve is preferably a reactive dye having a reactive hydroxyl group.

The crosslinker sleeve comprises in total 4 to 10% by weight of the total formulation.

The MDI preferably makes up 28 to 35% by weight of the total formulation, the polyol mixture 43 to 52% by weight, the propellant gas mixture 12 to 18% by weight and the crosslinker mixture 5 to 8% by weight.

It should be noted that all percentages refer to the total formulation, i.e. the weight of all components in the aerosol can and in the crosslinker sleeve as a whole, unless stated otherwise.

The invention further relates to the use of the formulations described above, independently of whether it involves a 2-component aerosol can or another kind of pressurized container, for filling cavities with foam, particularly of profiles and in vehicle bodyworks. Uses for sound insulation are included here.

The invention is elucidated in more detail by means of the following examples.

EXAMPLE 1

A polyol mixture for a foam formulation was composed as follows:
  73.0 parts by weight polyether polyol, OHN 56
  15.6 parts by weight TMCP
  5.0 parts by weight arom. polyester polyol based on PET, OHN 200
  1.0 part by weight polyoxypropylene triol, OHN 56
  1.0 part by weight foam stabilizer
  1.4 parts by weight cell opener
  1.4 parts by weight catalyst (DMDEE)

For this purpose, the following crosslinker mixture was prepared:
  77.50 parts by weight ethylene glycol
  20.70 parts by weight TMCP
  0.70 part by weight catalyst (2,2'-dimethylaminoethyl ether)
  0.50 part by weight catalyst (2-(2-dimethylaminoethoxy) ethanol)
  0.60 part by weight dye, OHN 100

44.0 parts by weight of the polyol mixture were reacted with 33.8 parts by weight crude MDI (Desmodur®) to give a prepolymer. The crosslinker sleeve was filled with 6.10 parts by weight of the crosslinker mixture which was employed in the bottom of the aerosol can. Subsequently, 7.8 parts by weight of a propane/butane mixture and 8.5 parts by weight dimethyl ether were filled under pressure into the closed aerosol can. This gave a functional foam formulation for a flexible elastic foam with good flow characteristics after deployment and a significantly improved sound insulation compared to commercial rigid foam formulations (−65 dB compared to −60 dB).

EXAMPLE 2

The polyol mixture in example 1 was modified as follows:
72.6 parts by weight polyether polyol, OHN 56
20.0 parts by weight TMCP
3.0 parts by weight polyester polyol based on PET, OHN 200
1.0 part by weight halogenated polyetherol, OHN 239
1.0 part by weight silicone stabilizer
1.0 part by weight cell opener
1.4 parts by weight DMDEE
51.3 parts by weight of the polyol mixture were reacted with 29.3 parts by weight crude MDI to give a prepolymer. The crosslinker sleeve was filled with 5.5 parts by weight of the crosslinker mixture of example 1 and employed in the bottom of the can. Then, 5.5 parts by weight of a propane/butane mixture and 8.5 parts by weight dimethyl ether were compressed into the closed aerosol can. On deploying the formulation, a flexible elastic foam resulted, which was non-adhesive after 8 minutes, ready for cutting after 12 minutes and had an end compressive strength of 0.8 N/cm$^2$. The sound insulation properties were comparable with that of the foam of example 1.

The invention claimed is:

1. A system comprising a formulation for producing an open-cell flexible foam having a compressive strength of ≤1N/cm$^2$, contained in an aerosol can and a crosslinker sleeve which can be opened prior to deploying the formulation from the aerosol can such that the contents thereof enter the aerosol can, wherein:
the aerosol can comprises:
a prepolymer having free isocyanate groups, the prepolymer being prepared from 25 to 35% by weight of diisocyanatodiphenylmethane (MDI) and 40 to 55% by weight of a polyol mixture relative to the total combined weight of all ingredients used to prepare the formulation; and
10 to 21% by weight of a propellant gas mixture relative to the total combined weight of all ingredients used to prepare the formulation;
the crosslinker sleeve comprises 4 to 10% by weight of a crosslinker mixture relative to the total combined weight of all ingredients used to prepare the formulation;
the polyol mixture comprises at least one trifunctional polyether polyol; at least one bifunctional polyester polyol; a flame retardant; a foam stabilizer; a cell opener; and an amine catalyst; and
the crosslinker mixture comprises ethylene glycol in deficiency relative to the free isocyanate groups of the prepolymer and at least one amine catalyst.

2. The system as claimed in claim 1, wherein the amount of ethylene glycol in the crosslinker mixture is sufficient to react with 80 to 95% of the free isocyanate groups of the prepolymer.

3. The system as claimed in claim 2, wherein the amount of ethylene glycol in the crosslinker mixture is sufficient to react with 85 to 90% of the free isocyanate groups of the prepolymer.

4. The system as claimed in claim 1, wherein a weight ratio of all polyols present in the polyol mixture to the flame retardant in the polyol mixture is in the range from 85:15 to 60:40.

5. The system as claimed in claim 1, wherein a weight ratio of the ethylene glycol to the flame retardant in the formulation is in the range from 35:65 to 60:40.

6. The system as claimed in claim 1, wherein the amine catalyst in the polyol mixture is capable of catalyzing a reaction of isocyanate groups with water.

7. The system as claimed in claim 1, wherein the at least one amine catalyst in the crosslinker mixture comprises two amine catalysts which are capable of catalyzing a reaction of isocyanate groups with ethylene glycol.

8. The system as claimed in claim 7, wherein the two amine catalysts are bis(2-dimethylaminoethyl) ether and 2-(2-dimethylaminoethyl)ethanol.

9. The system as claimed in claim 1, wherein the crosslinker mixture further comprises a dye.

10. The system as claimed in claim 1, wherein the polyol mixture further comprises a halogenated aliphatic polyol.

11. The system as claimed in claim 1, wherein the propellant gas mixture comprises propane, butane and dimethyl ether.

12. The system as claimed in claim 11, wherein the propellant gas mixture comprises 40 to 70% by weight of the dimethyl ether, based on the total weight of the propellant gas mixture.

13. The system as claimed in claim 1, wherein the MDI is crude MDI.

14. A method comprising utilizing the system of claim 1 for foam-filling cavities.

15. The method as claimed in claim 14, wherein said foam-filling provides sound insulation.

* * * * *